INVENTOR.
RONALD T. H. COLLIS
BY Samuel Lindenberg
Abraham Wasserman
ATTORNEYS

Dec. 26, 1967    R. T. H. COLLIS    3,360,793
AIRBORNE DETECTION AND DISPLAY SYSTEM
Filed Oct. 4, 1965    2 Sheets-Sheet 2

INVENTOR.
RONALD T. H. COLLIS
BY Samuel Lindenberg
Abraham Wasserman
ATTORNEYS

United States Patent Office 3,360,793
Patented Dec. 26, 1967

3,360,793
AIRBORNE DETECTION AND DISPLAY SYSTEM
Ronald T. H. Collis, Menlo Park, Calif., assignor to Stanford Research Institute, Menlo Park, Calif., a corporation of California
Filed Oct. 4, 1965, Ser. No. 492,761
14 Claims. (Cl. 343—5)

ABSTRACT OF THE DISCLOSURE

An airborne system in which lidar pulses are sequentially transmitted in at least one fixed direction, forming an acute angle with the aircraft's flight direction. Energy signals, reflected back from the last $y$ transmitted pulses, are continuously updated for storage and display on the surface of a CRT. Thereon, the $y$ received signals are displayed at an angle with respect to a line, representing the flight direction, so that the orientations of energy-reflecting targets representing atmospheric conditions with respect to the flight direction, are easily displayed. Some of the display signals represent targets which are behind the aircraft at the time of display. The orientations of the atmospheric conditions above and/or below the flight direction and their convergence with respect thereto are indicative of the atmospheric conditions existing along the flight direction ahead of the actual aircraft's position.

---

The present invention relates to meteorological instrumentation and more particularly to an airborne-type system for detecting and displaying the characteristics of the air about a flying aircraft.

At present radar systems are employed in aircraft to provide the aircraft pilot with data related to certain atmospheric conditions in the flight path, so that he may avoid flying over an area with severe weather conditions. Generally most presently used airborne-radar systems map the distribution of precipitation from which the presence of dangerous weather conditions such as severe air turbulence or dangerous storm centers along the flight path are determined.

Though highly useful, presently known conventional radar systems are quite limited in that they are insensitive to atmospheric constituents comprised of small particles such as for example, cloud droplets or dust particles. Knowledge of the presence and distribution of such particles is of great importance in the safe operation of an aircraft under certain conditions. Among the particles, the distribution and presence of which is of significant importance are clouds of ice crystals which are quite abrasive at supersonic speeds, or clouds obscuring visibility which is particularly disturbing in landing operations. In addition, the detection of areas of clear air turbulence, the presence of which may be revealed by reference to atmospheric motions recognizable from certain patterns and arrangements of cloud or dust, whether visible to the eye or not, is of great significance. Clear air turbulence, known by the acronym CAT has so far eluded any form of detection except when directly affecting an aircraft in flight.

A real need therefore exists for an airborne detection system, capable of detecting atmospheric phenomena, such as CAT and displaying the location of the phenomena with respect to the aircraft's flight path so that the pilot may avoid flying therethrough. It is appreciated that for the system to be most useful, the pilot must be provided with the desired data at an adequate range from the actual point of interception of the phenomena or turbulence and his flight path in order to give the pilot a maximum period in which to maneuver the aircraft into a safer path. Because of the high closing speeds of present day and future aircraft, any system relying on detecting phenomena directly in the aircraft's path must have very high range performance. However in accordance with the teachings of the present invention, advantage is taken of the known horizontal or near horizontal laminal nature of atmospheric phenomena to enable a pilot to indirectly anticipate or infer the presence of hazards dead ahead, by detecting and displaying the atmospheric conditions such as cloud or dust layers above and below the aircraft at closer range.

Accordingly, it is an object of the present invention to provide a novel airborne system for detecting and displaying various phenomena in the air about a flying aircraft.

Another object is the provision of a new airborne radar type system for detecting and displaying certain meteorological phenomenon in the atmosphere about the aircraft which herebefore were not detectable with known airborne radar systems.

A further object is to provide an airborne laser radar system in which signals in the optical frequency range are used to probe the atmosphere about a flying airplane to detect various dangerous atmospheric phenomena about the flight path and display their location with respect thereto.

Still a further object is the provision of an airborne laser radar system for detecting and displaying atmospheric conditions characteristic of clear air turbulence in the atmosphere above and/or below the flight path of an aircraft from which a pilot can determine the relative distance between the aircraft and point of intersection of the clear air turbulence and the aircraft's flight path.

Yet a further object is to provide a new airborne laser radar system for detecting and displaying the presence and relative orientation of atmoshperic conditions dangerous to the flight of an aircraft in the atmosphere above and/or below the flight path of the aircraft. The conditions are displayed so that the pilot may conveniently and easily determine the location of such conditions along the craft's flight path and maneuver the aircraft into a safer path.

Still another object of the invention is the provision of a new detection and display system in which the location of the ground with respect to the flight direction are clearly displayed to enable the pilot to most effectively and safely maneuver the aircraft on landing approaches.

Yet another object is the provision of a system in which the convergence of the ground and an aircraft's flight path are displayed to enable the pilot to perform safe landing maneuvers even under extreme ground visibility conditions.

These and other objects are achieved by providing an airborne laser-rader system which displays signals characteristic of air phenomena about rather than directly along the line of flight or flight direction of the aircraft, from which the pilot can anticipate the atmospheric conditions along the flight direction at points ahead of his present position and make any changes in the flight direction to avoid areas with severe weather conditions.

Briefly, in the laser radar system of the present invention hereafter also referred to as a lidar system, each of a succession of lidar pulses or signals is transmitted into the atmosphere in one or more predetermined directions with respect to the flight direction. Some of the pulse energy is reflected back as a function of the atmospheric conditions and is received and stored as a video signal. A plurality of successively received video signals are displayed in a two-dimensional display from which a pilot can ascertain the atmospheric conditions in a plane defined by his flight direction and the direction in which the lidar pulses are transmitted. When each lidar pulse is transmitted in directions above and below the flight directions, the display provides information related to the atmospheric conditions or presence of the ground in a vertical plane through and parallel to the aircraft's flight direction.

The display is continuously updated at a predetermined rate in the forward direction, i.e. in the flight direction by storing a predetermined number of the last received video signals, so that in essence the display presents the conditions behind the actual plane's position as well as above and below it. From such a display, a pilot can conveniently determine at a considerable lead time whether any atmospheric conditions or the ground which are to be avoided tend to converge on his flight direction and take appropriate action. The display may be utilized, together with other sensing devices, such as those sensing temperature and/or bumpiness, to provide significant data related to the atmospheric condition along the flight path considerably ahead of the plane's position in order to provide the pilot with adequate time to maneuver the plane to a safer path.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
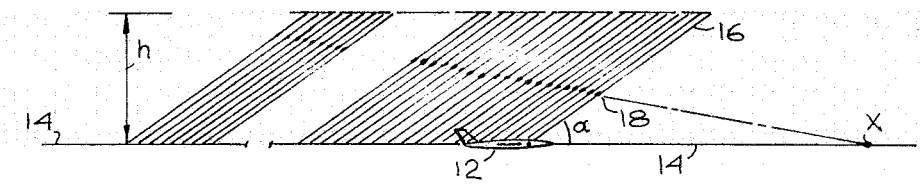
FIGURES 1 and 1(a) are simplified diagrams of a display incorporated in one embodiment of the invention.

Attention is now directed to FIGURE 1 which is a simplified diagram useful in explaining the novel display of the airborne lidar system of the present invention. According to the teachings of the invention, the system is incorporated on board an airplane 12 shown flying along a flight direction 14. The airborne system includes a lidar transmitter and receiver which probe the atmosphere above the flight path by transmitting periodic lidar pulses into the atmosphere in a forward direction at a selected angle $\alpha$ with respect to the flight direction 14. Reflected energy of each pulse, known as echoes, are received by the receiver from a chosen height range indicated by arrow $h$. These are converted into a video signal, the characteristics of which represent the atmospheric conditions in the direction in which the lidar pulse was transmitted.

Figure 1A:
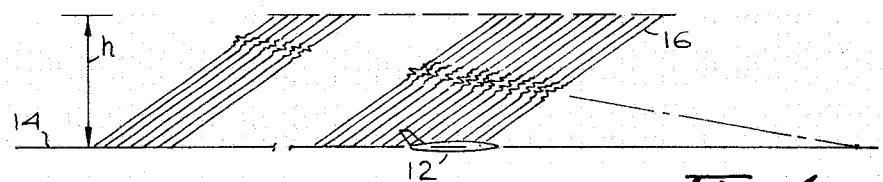

A plurality of $n$ video signals are stored and continuously displayed as $n$ traces 16 to provide the two-dimensional display shown in FIGURE 1. The displayed traces may be either intensity modulated to indicate certain atmospheric conditions at various distances from the plane, shown in FIGURE 1, or they may be amplitude modulated as shown in FIGURE 1(a). The display is updated in the forward direction by erasing the earliest stored video signal and recording the last received echoes. As a result, the display comprises traces which represent signals indicative of the atmospheric conditions in a plane which is immediately substantially behind the airplane and above it. The plane also extends to include a portion of the area above the airplane in a forward direction, but not dead ahead thereof. From such traces, an experienced pilot may anticipate or infer the conditions in the atmosphere in a particular direction with respect to his flight direction as well as the tendency of any disturbing phenomenon to converge on his flight path.

From the foregoing it should be appreciated that the system of the present invention provides the pilot with information from which he may infer the atmospheric conditions along his flight path with a fixed, rather than a scanning system, in which successive lidar pulses are directed into the atmosphere above the flight path at a fixed angle $\alpha$ at short ranges. Since the display consists of a plurality of $n$ traces the pulse repetition frequency can be relatively low, such as 1 p.p.s. This is particularly significant from a present-day laser technology point of view. If the information of the atmospheric conditions along the flight path had to be acquired by dead ahead laser scanning, because of the aircraft's high forward velocity, a high laser pulse repetition frequency (PRF) such as 500 to 1000 p.p.s. would be required. Such a high PRF at sufficient power is beyond the present state of laser technology.

For example, let us assume that the height range $h$ is 3 kilometers (km.) above the flight direction and that the airplane advances at 300 meters per second (m.p.s.) and the display includes 120 traces, recorded at one second intervals. Then it is seen that the display would provide the pilot with information related to the atmospheric condition in a plane of 3 x 36 km. which is substantially above him. By noticing a disturbing atmospheric condition, such as a cloud patch, indicated by intensity modulated points 18 on the plurality of traces he can anticipate the convergence of the condition unto the flight path 14 at a point $x$ ahead of him and take appropriate action.

Figure 2:
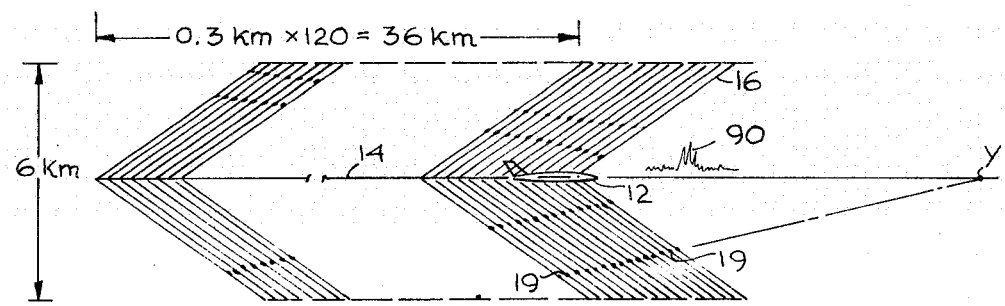
FIGURE 2 is a simplified diagram of a display incorporated in another embodiment of the invention.

The ability of a pilot to advantageously utilize the displayed data may be enhanced by displaying traces which represent signals indicative of conditions above and below the flight path. Such an arrangement is shown in FIGURE 2 to which reference is made herein. Assuming the previous values, the pilot is then provided with data related to the atmospheric conditions in a plane of about 216 square kilometers extending behind him and both above and below his flight path, as well as above and below him in a forward direction, but not dead ahead. Such a d splay greatly increases his capability to detect the atmospheric conditions around him and in particular determine which of the conditions tend to converge on his flight path and the approximate point of convergence. Providing him such data with a considerable lead time enables him to make any necessary or desirable course correction in sufficient time. This characteristic is particularly significant for modern airplanes which advance at very high speeds.

It should be appreciated that the displayed data may also include a display of signals or echoes reflected from the ground so that the pilot may watch the convergence of the ground and his flight direction. In FIGURE 2 for example the intensity modulated points indicated by reference numeral 19 represent hard echoes reflected from the ground, from which the pilot may infer that his flight path 14 and the ground converge at point $y$. Such a display is most useful for regular landing operations which may be performed even under severe visibility conditions, since the display provides the pilot with the capability of seeing and watching the convergence of the ground and his flight path.

Figure 3:
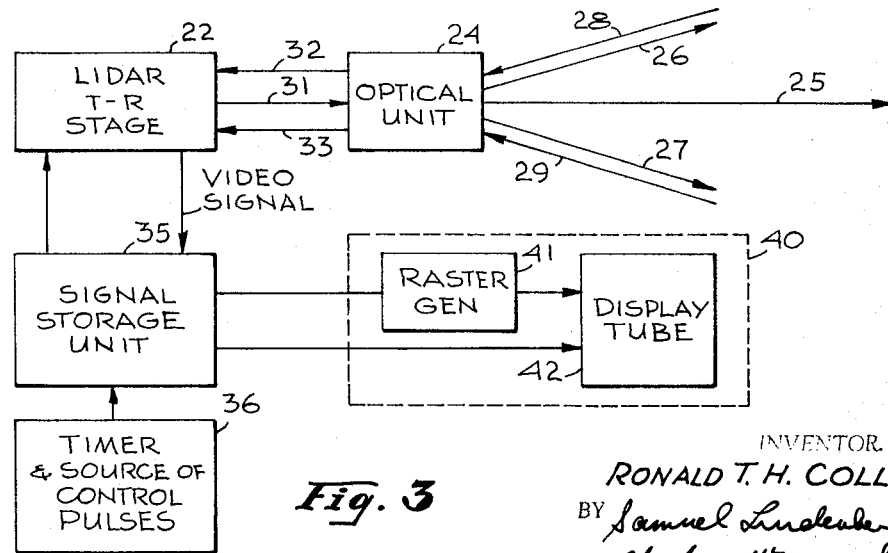
FIGURE 3 is a block diagram of the present invention.

Reference is now made to FIGURE 3 which is a simplified block diagram of the novel airborne lidar system of the present invention. The system which is assumed to produce a display such as the one shown in FIGURE 2 includes a lidar transmitter-receiver (T-R) stage 22 which is energized to supply pulses to an optical unit 24 at a predetermined pulse repetition frequency (PRF) such as 1 pulse per second. Unit 24 is used to simultaneously direct each pulse into the atmosphere in predetermined directions above and below a flight path 25. Arrows 26 and 27 represent the directions along which the transmitted pulses radiate into the atmosphere. Echoes from predetermined range heights above and below the flight path 25, represented by arrows 28 and 29 respectively, are received by stage 22 through the optical unit 24. In FIG- URE 3 arrow 31 represents a pulse transmitted by stage 22 while arrows 32 and 33 represent the echoes received from above and below the flight path in response to such a transmitted pulse.

As is appreciated by those familiar with the art stage 22 may include two laser T-R boxes used to radiate lidar pulses into two different directions and receive echoes therefrom. Since the same pulse is to be directed into two directions, a single transmitter may be used together with a beam splitter which may be incorporated in the optical unit 24. However, two independent receiving units must be incorporated to receive the echoes arriving from the two directions, the received echoes or signals being designated by arrows 32 and 33.

The received echoes converted into video signals are supplied to and stored in a signal storage unit 35. Unit 35 and stage 22 are synchronized by means of a timer and source of control pulses 36, so that in response to each transmitted pulse unit 35 is in condition to receive and store the echoes or video signals received in response thereto. Also, unit 35 stores the video signals received as a result of previously transmitted $n$ pulses. Thus the unit stores signals for $2n$ traces. The stored video signals together with control pulses are supplied to a display stage 40 which provides a display such as that shown in FIGURE 2 in which $n$ traces represent the atmospheric conditions above the flight path and the other $n$ traces represent the atmospheric conditions below the flight path. The display stage 40 may comprise a raster generator 41 supplied with control pulses from the signal storage unit 35 and a display tube 42 such as a cathode ray tube (CRT) which is supplied with video signals from unit 35 and deflection signals from raster generator 41 to provide the two-dimensional display.

In practice, the display tube 42 is a dual beam tube, with each beam being deflected in accordance with the video signals and the deflection signals from raster generator 41. The video signals are continuously read out from units 35 to provide the two-dimensional display by sequentially reading out the video signals to form each trace. The tube is of the non-persistent type with a complete display raster or frame being generated within the retention time of the eye, so that a continuous TV-type picture is provided to the pilot. The content of signal storage unit is updated by erasing the earliest stored video signals and storing the latest received echoes in response to the last transmitted laser pulse. Thus, the display provides the pilot with the data related to the atmospheric conditions immediately behind the airplane both above and below its flight path.

Various presently known video signal recording and storing techniques may be employed to store the video signals or echoes received in response to each of the plurality of transmitted lidar pulses and to update the stored signals so that the echoes in response to the last $n$ pulses are available to be displayed. The unit 35 should include a signal recording device which has a sufficient bandwidth so that a meaningful part of the maximum bandwidth of lidar system may be recorded. Although bandwidth of certain lidar systems are on the order of 100 or more megacycles, it has been found that very useful meteorological information can be handled with considerably narrower bandwidths. If the bandwidth of the recording instrument is broad enough, the video signals can be directly recorded as received. Otherwise they may be subjected to bandwidth compression to simplify the recording task. For example, bandwidth compression can be accomplished before recording by integrating over successive pulse lengths in range as has been done in many meteorological radar applications, and therefore a detailed description is deemed unnecessary.

One example of a signal recording and storing instrument is a magnetic disc recorder on which the video signals, which are to be represented in each displayed trace are recorded on a separate track portion of the rotating disc. Control signals associated with each track portion and the video signals necessary to produce a complete raster or frame are also recorded on different tracks to provide the necessary control signals for the proper identification of the stored video signals as well as provide signals to energize the raster generator 41. One commercially available disc recorder which may conveniently be adapted for incorporation in the system herein disclosed is the video disc recorder manufactured by Machtronics of Mountain View, Calif.

Figure 4:
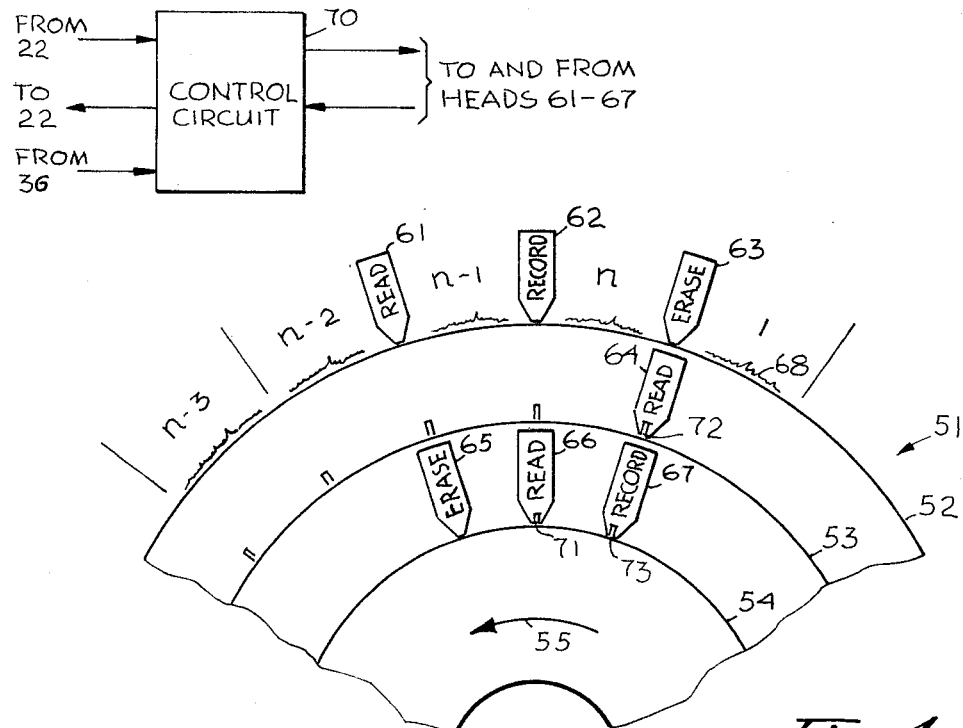
FIGURE 4 is a partial top view of a magnetic disc which can be incorporated in the signal storage unit shown in FIGURE 3.

Reference is now made to FIGURE 4 which is a partial top view of a magnetic disc on which video signals to be utilized in the system herein disclosed may be recorded. The disc 51 is shown comprising tracks 52, 53 and 54 with arrow 55 indicating the direction of rotation of the disc 51 which is used to store video signals received from a given direction either above or below the flight path. The disc is rotated at a rate adequate to provide the desired recording bandwidth and which is an integer number of the pulse repetition frequency at which lidar pulses are to be transmitted into the atmosphere.

Track 52 of the disc may be thought of as being divided into $n$ portions with each portion used to store video signals received from another transmitted pulse. In FIGURE 4, in portion 1 are stored the earliest received signals, while in portion $n$ are stored the last received signals. As seen in track 53 a pulse is recorded for each portion of track 52. Also a pulse 71 is recorded on track 54 in relation to the beginning of the last recorded portion $n$. Seven heads 61 through 67 the functions of which are indicated are positioned adjacent the three tracks. The storage unit 35 (FIGURE 3) also includes a control circuit 70 which is energized by the timer and source of control pulses 36. Circuit 70 is also connected to the lidar T-R stage 22 as shown and to all seven heads.

Let us assume that at a time $t_0$ prior to that diagrammed in FIGURE 4, the timer and source of control pulses 36 triggers circuit 70 to erase the earliest stored signals, produce a lidar pulse and store the echoes or video signals received in response thereto. Then at time $t_1$ diagrammed in FIGURE 4 the pulse 71 associated with the track portion $n$ on which the last signals were recorded will be sensed by read head 66. As a result, read head 64 will read pulse 72 on track 53, the pulse being associated with the earliest track portion number 1 on track 52. Pulse 72 will be transferred to circuit 70 and therefrom to record head 67 to be recorded as pulse 73 on track 54. Concurrently therewith, erase head 63 will be energized to erase the earliest recorded video signals 68 in track portion 1.

As the disc 51 moves in the direction shown by arrow 55 by one track portion, the signals 68 in portion 1 will be completely erased and frame pulses 71 and 73 will be located under heads 65 and 66. Head 65 will erase pulse 71 and the reading of pulse 73 by read head 66 will cause circuit 70 to trigger T-R stage 22 to transmit a lidar pulse into the atmosphere. Thus, as echoes are received the video signals then will be recorded in track portion 1 by record head 62 as the portion passes underneath, thereby completing the recording cycle.

Read head 61 continuously reads the video signals recorded in the various track portions and supplies them to tube 42 to be displayed as traces thereon. Also the trace pulses on track 53, such as pulse 72 and the last recorded frame pulse 73 on track 54 are supplied to raster generator 41 (FIGURE 3) to generate the necessary deflection signals and provide the desired display.

Figure 5:
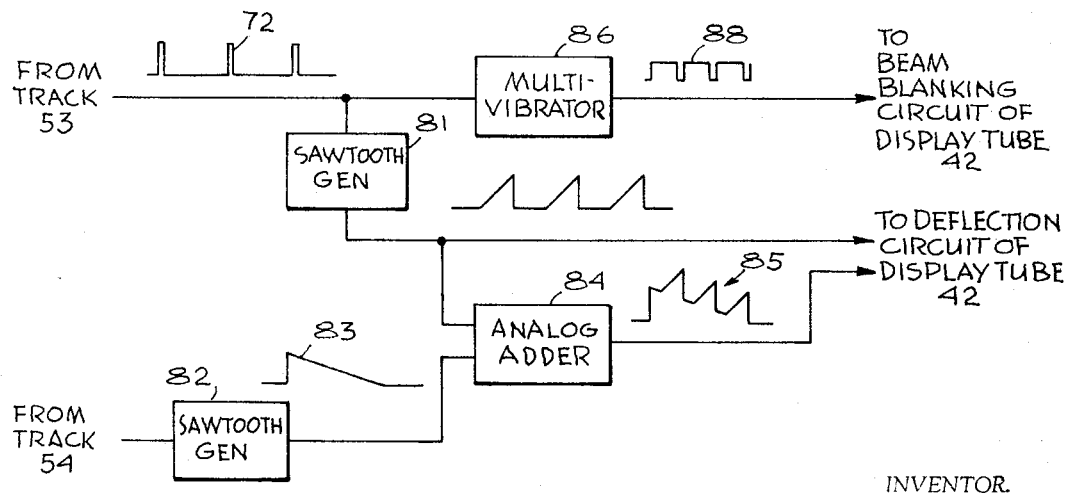
FIGURE 5 is a block and waveform diagram useful in explaining the operation of the raster generator shown in FIGURE 3.

As is appreciated by those familiar with the art, the pulses from track 53 each one of which is related to another portion of track 52 and therefore to another trace of the two-dimensional display may be used to trigger a sawtooth generator 81 shown in FIGURE 5 to which reference is made herein. The output of the generator can then be used to provide $y$ axis deflection for tube 42

(FIGURE 3). Also the frame pulse 73 may be utilized to trigger another sawtooth generator 82 to provide a ramp signal 83. Signal 83 is combined with the output of generator 81 directly or after proper attenuation in an analog adder 84 to provide a voltage signal having a waveform 85 which can be used to provide the necessary x axis deflection. The pulses from track 53 video signals can also be used to trigger a multivibrator 86 to provide unblanking pulses 88 which are supplied to the blanking circuit of display tube 42. The video signals read out by read head 61 (FIGURE 4) may be used to control the intensity control circuit of tube 42 so that the atmospheric conditions which are to be displayed to the pilot are provided in the form of a beam intensity modulation.

It should be appreciated that when the final display is to include traces representing signals or echoes received from both above and below the flight path such as the display shown in FIGURE 2, two magnetic disc recorders and associated circuitry, necessary to provide deflection signals to deflect each of the two beams in the display tube, are required. It should also be appreciated that although in the foregoing description the novel display of the lidar system of the invention has been assumed to incorporate beam intensity modulation techniques, amplitude modulation techniques may be used with similar advantages to provide the pilot with the desired information. FIGURE 1(a) is an example of a display in which amplitude modulation is used to display the location of certain atmospheric conditions for the flight direction.

In addition to providing the pilot with a display related to the atmospheric conditions above and below his flight path, the pilot may desire a display of signals received from a lidar pulse transmitted in the direction of his flight path. This feature may conveniently be added by providing the pilot with sufficient manual controls (not shown) to cause the lidar T-R stage 22 to transmit (not shown) a lidar pulse in the direction of the flight path 25 (FIGURE 3), i.e. dead ahead. The returned echoes may then be supplied through the disc recorder to the display tube 42 and displayed thereon as a two-dimensional waveform such as that designated in FIGURE 2 by numeral 90. If the pulse repetition frequency of the lidar pulse is too low to produce a TV-like display, which appears continuous due to the eye's retention, the echoes may be recorded on the disc recorder and read out repeatedly to produce a continuous display effect.

Although in the foregoing the novel teachings of the invention have been described in conjunction with a CRT-type display, it is appreciated that other two-dimensional display arrangements may be employed in practicing the invention. For example, a two-dimensional graph-type printing device or recorder may be used to provide the final display. As herebefore described, each of the received signals or echoes is stored in real time in a storage stage such as a magnetic disc recorder. Then, the video signals which are to comprise a separate trace are read out and held in a buffer stage until they are recorded by the slower-speed printing device or recorder. Thus a permanent record is provided from which the pilot may determine the atmospheric conditions above and below him and from it ascertain whether a dangerous meteorological phenomenon which is to be avoided is along his flight path.

Although the invention has been described in conjunction with laser radar (lidar) pulses it becomes apparent to those familiar with the art that the teachings of the invention are applicable to systems which use pulses or signals others than laser pulses which are in the visible frequency spectrum. For example, the novel display of the system may be used in conjunction with a microwave radar system in which radar pulses in the microwave frequency range are radiated into the atmosphere and reflected energy is detected. It is appreciated however that depending upon the frequency of such a microwave radar systemonly ground echoes or precipitation size particles would generally be detected and displayed.

There has accordingly been shown and described herein a novel airborne system including a two-dimensional display. The display provides the pilot with information relating to the atmospheric conditions as well as its relationship to the ground in a particular plane about the aircraft. From such information, the pilot can determine the conditions along his flight path and take any actions necessary to prevent flying through air volumes with severe atmospheric conditions, as well as use the information for landing maneuvers. Since lidar systems have been found to be quite sensitive to various phenomenon heretofore undetected such as particulate matter in visually clean air, or the particulate matter of non-precipitating clouds, the system herein disclosed can be advantageously used to provide the pilot with instant information related thereto. The system provides the pilot with considerable lead time so that even with modern high speed aircraft, the pilot has in most cases sufficient time to undertake the necessary maneuvers to circumvent any dangerous conditions along his path. Also the display provides the pilot with information of cloud conditions or the position of the ground relative to the aircraft's path which is of value in carrying out landing and other maneuvers.

It is appreciated that modifications may be made by those familiar in the art in the arrangements as shown without departing from the true spirit of the invention. Therefore, all such modifications are deemed to fall within the scope of the invention as claimed in the appended claims.

What is claimed is:

1. An airborne lidar system for providing aboard an aircraft a display representing conditions in the atmosphere in directions related to the flight direction of said aircraft the system comprising:

lidar transmitting and receiving means for transmitting lidar pulses of a substantially single frequency at a predetermined pulse repetition frequency into the atmosphere in at least one fixed direction defined with respect to said flight direction and forming a predetermined angle therewith, and for receiving in response to each transmitted pulse video signals comprising of transmitted pulse energy reflected by a target in the atmosphere in a selected height range in the direction in which each lidar pulse is transmitted;

signal-storage means for continuously storing the last y received video signals, said signal-storage means including means for updating the stored signals whereby the earliest received signals are erased and the last received signals are stored therein; and display means for displaying the video signals last stored in said signal-storage means to present the atmospheric conditions in the height range of each of the directions in which the transmitted lidar pulses corresponding to said displayed video signals have been transmitted, said display means including a two-dimensional display surface and means for displaying on said surface the last y received video signals, all extending from a displayed line defining the aircraft's flight direction and forming an angle therewith, which is equal to said predetermined angle between the aircraft's flight direction and the fixed direction in which the lidar pulses are transmitted.

2. The airborne lidar system defined in claim 1 wherein said signal-storage means comprise a magnetic disc recorder coupled to said lidar transmitting and receiving means and to said display means, said recorder including a control unit and a magnetic surface defining a plurality of tracks for storing therein the y last received video signals in y track portion of one of the plurality of tracks and for storing control signals in the other tracks, one of said other tracks storing a control signal for each track portion in which video signals are stored, said recorder further including a plurality of magnetic heads positioned adjacent said tracks for sensing the track portion on which the earliest received video signals are stored, for erasing said earliest received video signals and for storing in the same track portion the last received video signals.

3. The airborne lidar system defined in claim 1 wherein said display means include a deflectable beam with each of said video signals being displayed by controlling the modulation of the beam deflected on said display surface as a function of the characteristics of each of said video signals, and at least some of the displayed signals represent signals reflected to said receiving means from targets in the atmosphere which are behind the aircraft at the time the signals are displayed.

4. An airborne lidar system for providing a display aboard an aircraft of the conditions of the atmosphere and the distance of the ground from the aircraft in a vertical plane including the flight direction of said aircraft the system comprising:
   lidar transmitting means for transmitting lidar pulses at a predetermined pulse repetition frequency into the atmosphere in fixed directions above and below said flight direction said directions defining predetermined fixed angles with respect to said flight direction and defining a single vertical plane therewith;
   lidar receiving means for receiving video signals, each comprising the energy of a different transmitted lidar pulse which is reflected back by an atmospheric target or the ground in a predetermined height range from said flight direction, the characteristics of each video signal being a function of the target or the ground in the direction from which the signal is received;
   signal-storage means coupled to said lidar receiving means for storing the last received y video signals comprising the reflected energy of the last transmitted y lidar pulses transmitted in each of said directions above and below said flight direction, said signal-storage means including means for updating the stored signals whereby the earliest received video signals from each direction are erased and the last received video signals are stored therein; and
   means for displaying the stored video signals to provide a display of information related to the atmospheric targets above and below the flight direction in a vertical plane including said flight direction and the relationship of the ground with respect thereto.

5. The airborne lidar system defined in claim 4 wherein said means for displaying include a two-dimensional display surface and a deflectable beam displaying the characteristics of the video signals on said surface as a function of the modulation thereof, said means for displaying further including means for deflecting said modulated beam on said surface about opposite sides of a line defining said flight direction, with the modulated beam above said line representing the atmospheric targets in said vertical plane above said flight direction and the modulated beam below said line representing the atmospheric conditions and the ground below said flight direction in said vertical plane.

6. The airborne lidar system defined in claim 4 wherein said signal-storage means comprises a magnetic disc recorder having a magnetic surface defining a plurality of tracks for storing the last received y video signals from each direction in y track portions of another track and for storing control signals related thereto, one control signal being associated with each track portion in which video signals are stored, said recorder including means responsive to some of the stored control signals for successively erasing the earliest received video signals and storing the last received video signals thereinstead, said means for displaying including means responsive to control signals stored on said magnetic surface for controlling the display of said stored video signals whereby the video signals are displayed with respect to a line, defining said flight direction, in the fixed predetermined angles with respect thereto.

7. An airborne lidar system for providing a display aboard an aircraft of conditions of the atmosphere detectable with microwave energy of a predetermined frequency range and the distance of the ground from said aircraft in a common plane including the flight direction of said aircraft the system comprising:
   microwave energy transmitting means for transmitting into the atmosphere pulses at a predetermined pulse repetition frequency of microwave energy in a selected fixed frequency range each pulse being transmitted in directions above and below said flight direction at preselected fixed angular relationships with respect thereto, said directions and the flight direction being in a fixed common plane;
   microwave energy receiving means for receiving video signals, each comprising the energy of a different transmitted microwave energy pulse which is reflected back by the atmosphere or the ground in a predetermined height range from said flight direction, the characteristics of each video signal being a function of the atmospheric conditions or the ground in the direction from which the signals are received;
   signal-storage means for storing the last received y video signals comprising the reflected energy of the last transmitted y microwave energy pulses transmitted in each of said directions above and below said flight direction, said signal-storage means including means for updating the stored signals whereby the earliest received video signals from each direction are erased and the last received video signals are stored therein; and
   means for displaying the stored video signals to provide a display of information related to the atmospheric conditions above and below the flight direction in said common plane including said flight direction, and the relationship of the ground with respect thereto.

8. The airborne system defined in claim 7 wherein said means for displaying include a two-dimensional display surface and a deflectable beam for displaying the characteristics of the video signals as a function of the modulation of said beam on said surface.

9. The airborne system defined in claim 7 wherein said signal-storage means comprises a magnetic disc recorder having a magnetic surface defining a plurality of tracks for storing the last received y video signals from each direction in y track portions of another track and for storing control signals related thereto, said recorder including means for successively erasing the earliest received video signals and storing the last received video signals thereinstead, and means for supplying some of said control signals to said means for displaying to control the display of the stored signals thereon with respect to a direction, representing the aircraft's flight direction.

10. An airborne lidar system for providing aboard an aircraft a display representing conditions in the atmosphere in directions related to the flight direction of said aircraft the system comprising:
   lidar transmitting and receiving means for transmitting lidar pulses at a predetermined pulse repetition frequency into the atmosphere in at least one direction defined with respect to said flight direction to form a predetermined angle therewith, and for receiving in response to each transmitted pulse video signals comprising of transmitted pulse energy reflected by the atmosphere in a selected height range in the direction in which each lidar pulse is transmitted;
   signal-storage means for storing a predetermined number of the last received video signals, said signal-storage means including means for updating the stored signals whereby the earliest received signals are erased and the last received signals are store therein; and means for displaying the video signals last stored in said signal-storage means to present the atmospheric conditions in the height ranges of each of the directions in which the transmitted lidar pulses corresponding to said displayed video signals have been transmitted;

said signal-storage means comprises a magnetic disc recorder having a magnetic surface defining a plurality of tracks for storing therein the $y$ last received video signals in $y$ track portion of one of the plurality of tracks and for storing control signals in the other tracks;

said means for displaying comprises cathode ray display means including a deflectable beam and a two-dimensional display surface and raster generator means, said raster generator means being responsive to said control signals for providing deflection signals for said cathode ray display means, said cathode ray display means being further responsive to the last received $y$ video signals stored in the $y$ track portions of one of said plurality of tracks for displaying said video signals on said two-dimensional display surface.

11. An airborne lidar system for providing a display aboard an aircraft of the conditions of the atmosphere and the distance of the ground from the aircraft in a plane extending parallel and through the flight direction of said aircraft the system comprising:

lidar transmitting means for transmitting lidar pulses at a predetermined pulse repetition frequency into the atmosphere each pulse being transmitted in directions above and below said flight direction said directions defining predetermined angles with respect to said flight direction;

lidar receiving means for receiving video signals, each comprising the energy of another lidar pulse transmitted in another direction which is reflected back by the atmosphere or the ground in a predetermined height range from said flight direction, the characteristics of each video signal being a function of the atmospheric conditions or the ground in the direction from which the signal is received;

signal-storage means for storing the last received $y$ video signals comprising the reflected energy of the last transmitted $y$ lidar pulses transmitted in each of said directions above and below said flight direction, said signal-storage means including means for updating the stored signals whereby the earliest received video signals from each direction are erased and the last received video signals are stored therein; and means for displaying the stored video signals to provide a display of information related to the atmospheric conditions above and below the flight direction in a plane through and parallel with said flight direction and the relationship of the ground with respect thereto;

said signal-storage means comprises a magnetic disc recorder having a magnetic surface defining a plurality of tracks for storing the last received $y$ video signals from each direction in $y$ track portions of another track and for storing control signals related thereto, said recorder including means for successively erasing the earliest received video signals and storing the last received video signals thereinstead;

said means for displaying comprises cathode ray display means including a deflectable beam and a two-dimensional display surface and raster generator means, said raster generator means being responsive to said control signals for providing deflection signals for said cathode ray display means, said cathode ray display means being further responsive to the last received $y$ video signals stored in the $y$ track portions of one of said plurality of tracks for displaying said video signals on said two-dimensional display surface.

12. An airborne lidar system for providing a display aboard an aircraft of conditions of the atmosphere detectable with microwave energy of a predetermined frequency range and the distance of the ground from said aircraft in a plane extending parallel and through the flight direction of said aircraft the system comprising:

microwave energy transmitting means for transmitting into the atmosphere pulses at a predetermined pulse repetition frequency of microwave energy in a selected frequency range each pulse being transmitted in directions above and below said flight direction said directions defining predetermined angles with respect to said flight directions;

microwave energy receiving means for receiving video signals each comprising the energy of another microwave energy pulse transmitted in another direction which is reflected back by the atmosphere or the ground in a predetermined height range from said flight direction, the characteristics of each video signal being a function of the atmospheric conditions or the ground in the direction from which the signals are received;

signal-storage means for storing the last received $y$ video signals comprising the reflected energy of the last transmitted $y$ microwave energy pulses transmitted in each of said directions above and below said flight direction, said signal-storage means including means for updating the stored signals whereby the earliest received video signals from each direction are erased and the last received video signals are stored therein; and means for displaying the stored video signals to provide a display of information related to the atmospheric conditions above and below the flight direction in a plane through and parallel with said flight direction, and the relationship of the ground with respect thereto;

said signal-storage means comprises a magnetic disc recorder having a magnetic surface defining a plurality of tracks for storing the last received $y$ video signals from each direction in $y$ track portions of another track and for storing control signals related thereto, said recorder including means for successively erasing the earliest received video signals and storing the last received video signals thereinstead;

said means for displaying comprises cathode ray display means including a deflectable beam and a two-dimensional display surface and raster generator means, said raster generator means being responsive to said control signals for providing deflection signals for said cathode ray display means, said cathode ray display means being further responsive to the last received $y$ video signals stored in the the $y$ track portions of one of said plurality of tracks for displaying said video signals on said two-dimensional display surface.

13. An airborne detection and display system for providing a display of atmospheric conditions, represented by atmospheric targets, about a flight direction of an aircraft in a plane which includes the flight direction, the system comprising:

first means for sequentially transmitting pulses of electromagnetic energy of a substantially single frequency into the atmosphere in at least one fixed direction, having a selected fixed angular relationship with respect to said flight direction and defining a common single plane therewith;

second means for receiving transmitted pulse energy signals which are reflected back to said aircraft by targets representing atmospheric conditions in the atmosphere in which the pulses of energy were transmitted;

storing means for storing $y$ of the last received reflected signals; and display means for displaying on a display surface thereof said y last received reflected signals on at least one side of a displayed direction on said surface defining said flight direction, whereby the orientations of the displayed signals on said surface with respect to said displayed direction, are representative of the orientations of atmospheric conditions in said plane including said flight direction, and with respect thereto.

14. The airborne system as recited in claim 13 wherein said first means transmits said pulses in a direction forming an acute angle with said flight direction, and said second means receives signals reflected from a height not exceeding a selected height range from said flight direction, and at least some of the displayed signals represent signals reflected to said aircraft from targets which are behind said aircraft at the time the signals are displayed.

References Cited

UNITED STATES PATENTS 2,822,536    2/1958    Sandretto _____ 343—5 X
3,113,211    12/1963    Thews.

RODNEY D. BENNETT, *Primary Examiner.*

C. L. WHITHAM, *Assistant Examiner.*